July 14, 1953 P. E. HAWKINSON 2,645,147
TIRE TREAD REMOVING AND TRUING DEVICE
Filed Nov. 4, 1949 3 Sheets-Sheet 1

Inventor
Paul E. Hawkinson
By his Attorneys
Merchant & Merchant

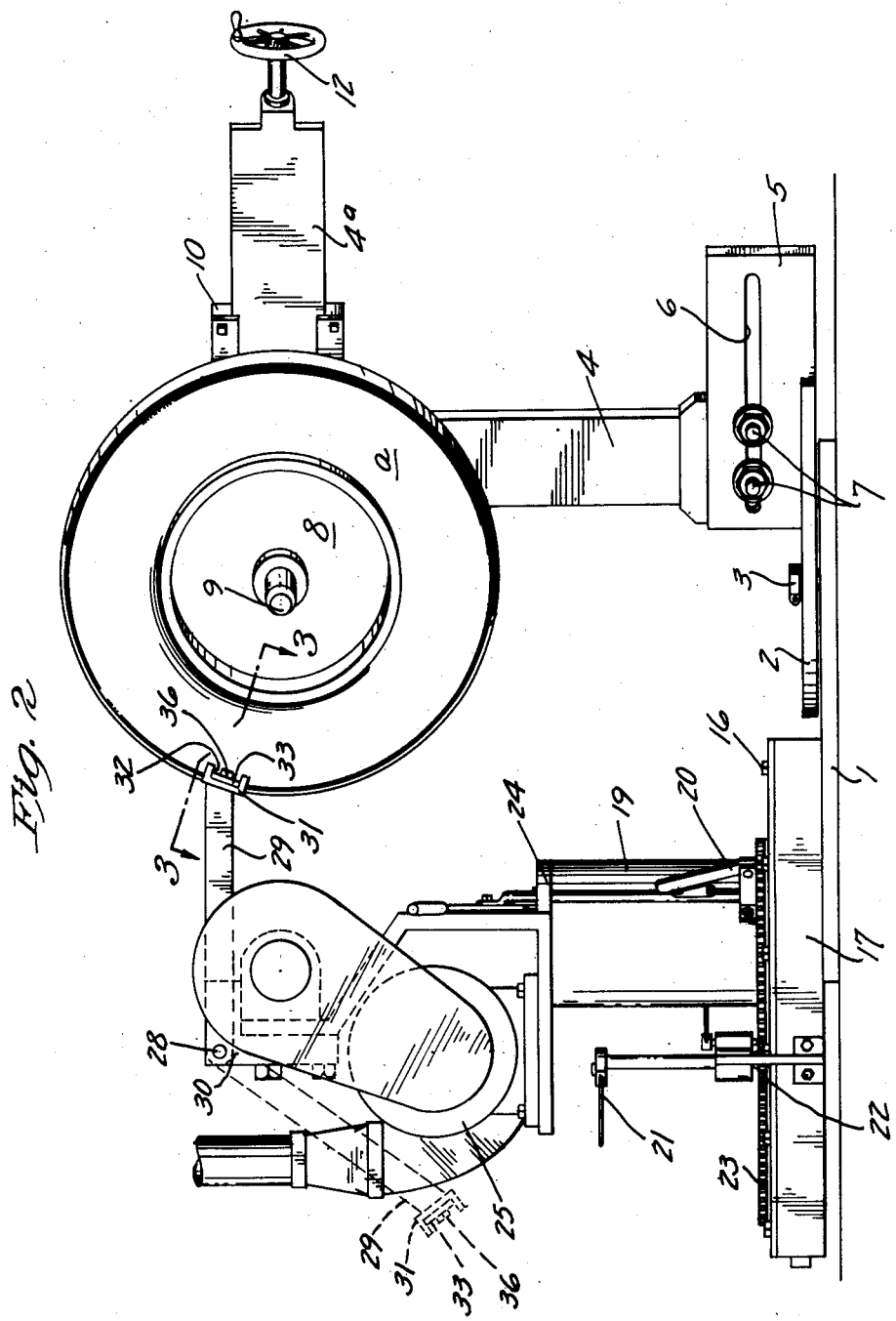

July 14, 1953　　　P. E. HAWKINSON　　　2,645,147
TIRE TREAD REMOVING AND TRUING DEVICE
Filed Nov. 4, 1949　　　3 Sheets-Sheet 3
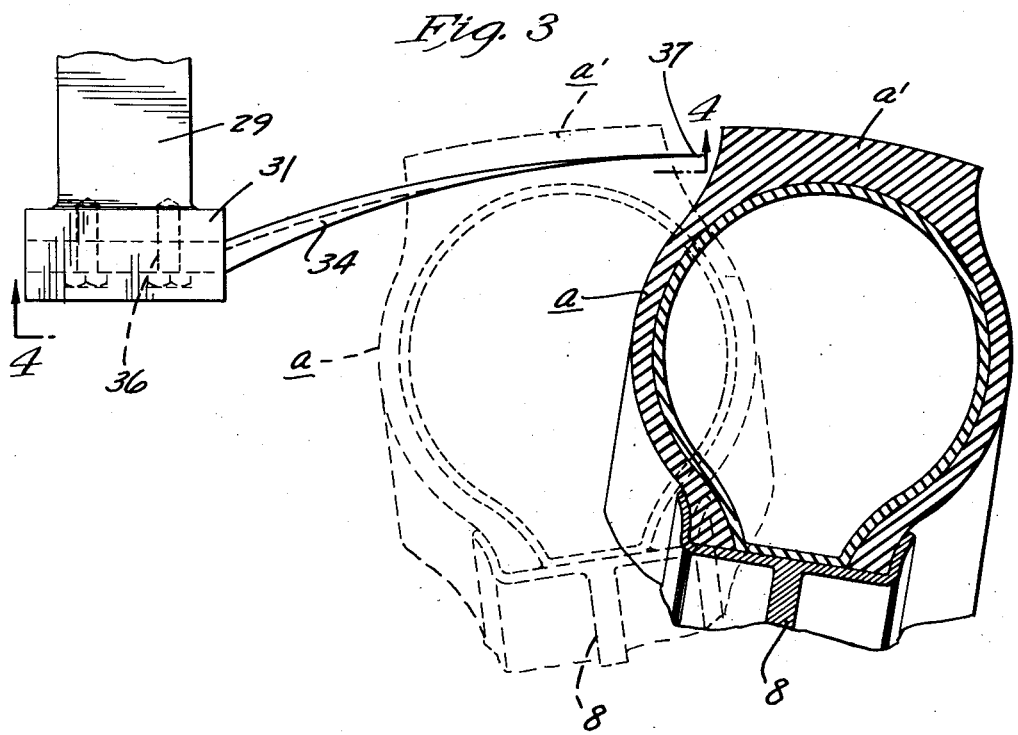
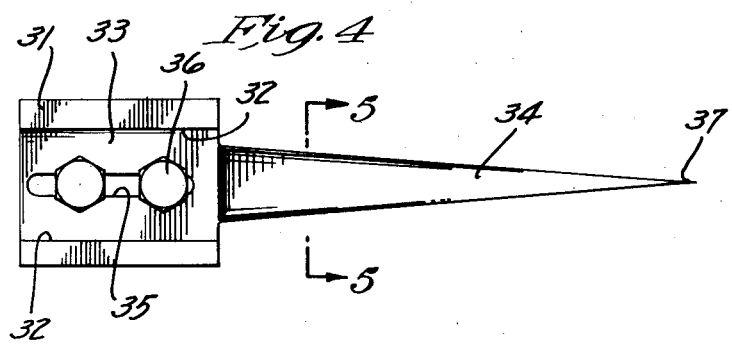
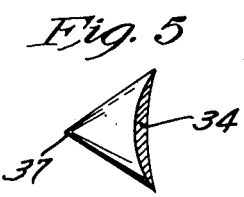
Inventor
Paul E. Hawkinson
By his Attorneys
Merchant & Merchant Patented July 14, 1953

2,645,147

UNITED STATES PATENT OFFICE 2,645,147

TIRE TREAD REMOVING AND TRUING DEVICE

Paul E. Hawkinson, Minneapolis, Minn., assignor to Paul E. Hawkinson Company, Minneapolis, Minn., a corporation of Minnesota Application November 4, 1949, Serial No. 125,631

4 Claims. (Cl. 82—2)

My invention relates to pneumatic tire treating devices and, more particularly, to a novel detreading machine.

The primary object of my invention is the provision of a novel detreading device, which is capable of removing the worn or damaged tread of a tire on any desired arc and by means of a novel tread-cutting knife which works from one side of the tread to the other at any desired distance below the tread-engaging surface. I have found that this particular method of removing the worn tread is not only the quickest and most accurate but also that it is particularly beneficial, if not essential, where the tread contains wire or other non-skid elements.

Another object of my invention is the provision of a novel detreading structure which may be used in conjunction with a lathe-like buffer of the type disclosed and claimed in my United States Patent No. 2,392,667 and in my copending United States application for patent, S. N. 116,180, filed September 16, 1949, now Patent No. 2,610,446, and entitled "Machine for Buffing Tires," and which may be quickly placed into and removed from operative position.

The above and still further objects and advantages of my invention will become apparent from the following detailed specification, appended claims, and attached drawings.

Referring to the drawings, wherein like characters indicate like parts throughout the several views:

Fig. 2 is a view in side elevation thereof;

Fig. 3 is an enlarged fragmentary view, partly in section and partly in elevation, taken substantially on the line 3—3 of Fig. 2;

Fig. 4 is a view in plan, taken on the line 4—4 of Fig. 3; and

Fig. 5 is an enlarged sectional view, taken on the line 5—5 of Fig. 4.

Figure 1:
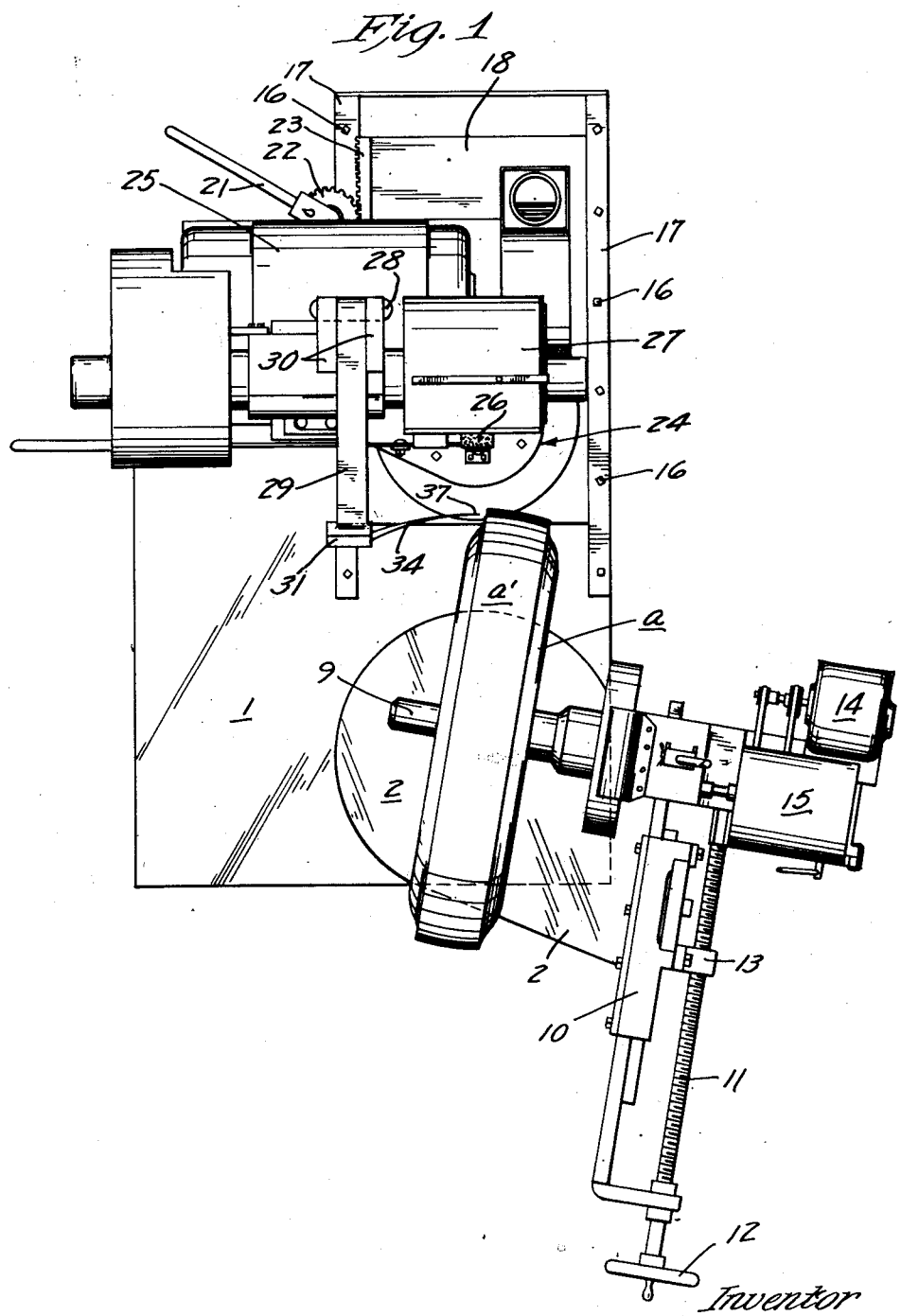
Fig. 1 is a plan view of my novel device.

Referring with greater particularity to the drawings, the numeral 1 indicates a base plate to which a support 2 in the nature of a turntable is pivotally secured on a vertical axis, as indicated at 3. A standard 4 is secured to the support 2 through the medium of a bracket 5 which is horizontally slotted as at 6 to permit sliding adjustments of the standard 4 through the medium of nut-equipped anchoring bolts 7 which extend therethrough and through the slots 6. A tire casing a is rotatably mounted on the upper portion of the standard 4 through the medium of a rim-equipped wheel 8 which in turn is journalled on a horizontal shaft 9 secured to a slide member 4a supported for longitudinal movement in a block or cross head 10 supported on the upper end of standard 4 for vertical adjustment thereon, all as more specifically described in my above referred-to U. S. Patent No. 2,610,446. Movement of the horizontal pivot 9 with respect to the vertical pivot 3 is accomplished through the medium of a screw 11 provided with a hand wheel 12, which passes through a nut-acting threaded projection 13 on the cross head 10. The motor 14 and the clutch 15, together with associated parts for rotating the tire a, are not described in detail as they do not play a part in my present invention and reference to said co-pending application may also be had for this purpose.

It will be seen from the above that a tire a, mounted as illustrated in Figs. 1 and 2, may be rotated about the vertical axis 3, whereby the tread portion a' describes an arc overlying the intermediate portion of the base plate 1, and also that the horizontal axis 9 may be adjustably moved toward and from the vertical axis 3 by manipulation of the handle 12 on the screw 11.

Secured to the intermediate portion of the base plate 1, by means of screws or the like 16, are a pair of spaced parallel guide bars 17 between which is slidably secured a slide 18. Adjustably rotatably secured on the slide 18, by means described in detail in said above-identified co-pending application, is a post or pedestal 19. The brake mechanism 20 for locking the pedestal 19 in a desired position, as well as the crank 21, associated gear 22, and rack 23 for imparting movements to the slide 18 are likewise described in detail in said co-pending application. A platform 24 is rigidly secured to the upper end of the post 19 and has rigidly secured thereto a motor 25. Adapted to be driven by said motor 25 on a horizontal axis is a buffing wheel 26, the forward portion of which extends out of a hood 27, also as described in detail in my above-identified co-pending application. The only important point to observe here is that the axis 3 is in the central plane of the buffing wheel 26 at right angles to the axis thereof.

Pivotally secured to the housing of motor 25 on a horizontal axis 28 is an arm 29 which, in the operative full line position of Figs. 1 and 2, projects laterally outwardly therefrom in a direction to intersect the arcuate path of travel described by the tread portion a' of tire a as the standard 4 is rotated about its vertical axis 3. However, as shown particularly in Fig. 1, the arm 29 is laterally positioned with respect to and generally parallel to the buffing wheel 26. Preferably and as shown, the arm 29 may be moved pivotally from the full line to the dotted line position of Fig. 2 when not in use. Also, when the arm 29 is moved to its operative generally horizontal position of Fig. 2, it is snugly seated between opposed guide elements 30 which prevent wobble. At its outer end, the arm 29 is provided with a head 31 which is provided with a laterally outwardly-opening slotted guideway 32 into which the butt end 33 of an elongated arcuate tapering tread-cutting blade 34 is slidably secured. It will be noted that the butt end 33 of the blade 34 is provided with an elongated axially-extended slot 35 through which is adapted to pass the intermediate portions of headed adjustment screws 36 which have threaded engagement on their inner ends with the head 31.

It will be noted, particularly by reference to Figs. 3, 4, and 5, that the tread-cutting blade 34 has a longitudinal arc roughly conforming to the arc described by the tread $a'$ of the tire $a$ as it is rotated about the vertical axis 3; and it will be observed, by reference to Fig. 1, that the said blade 34 is generally parallel to said arc. Another important feature of the tread-cutting blade 34 is that it tapers to a relatively sharp point 37. A still further important feature of the blade is that the same is cross-sectionally arcuate in shape, as particularly indicated by Fig. 5. Lastly, it is important to note that the pointed end 37 of the knife 34 extends substantially to the plane of the transverse center of the buffing wheel 26.

When it is desired to remove the tread $a'$ from the tire $a$, the tire $a$ is mounted on the wheel 8 and the wheel 8 in turn mounted on a horizontal axis as indicated in Fig. 1. The desirable cutting arc is then arrived at by manipulation of the crank 21 and associated gear 22 and rack 23, whereby to vary the distance between the point 37 of the tread-cutting blade 34 and the vertical axis 3. Thereafter, the support 2 is rotated on the axis 3 and the hand wheel 12 is rotated to position the cutting point 37 of the blade 34 at the adjacent side of the tread $a'$ at any desired depth from the worn road-engaging surface. Thereafter, rotation of the tire about its horizontal axis 9 and rotation of the support 2 about its vertical axis 3 will cause the knife to completely pass through the tread $a'$ from side to side, as indicated by dotted lines in Fig. 3. The longitudinal and transverse arcs of the blade 34 prevent undue friction of the tread $a'$ and the casing $a$ on the cutting blade 34 as it passes completely through the tread $a'$. Thereafter, the arm 29 and blade 34 are moved to the dotted line position of Fig. 1 and the tread subjected to treatment by the buffing wheel 26. In view of the fact that most of the tread has been removed by the blade 34, only sufficient buffing is necessary to roughen up the relatively smooth surface which has been created by the blade 34. In this manner, a great saving of time is effected inasmuch as it would normally be necessary to remove that portion of the tread by buffing, which, by my novel structure, may be quickly and accurately removed by blade 34.

My invention has been thoroughly tested and found to be completely satisfactory for the accomplishment of the above objects; and, while I have disclosed a commercial form of my invention, it should be obvious that the same is capable of modification without departure from the spirit and scope of the appended claims.

What I claim is:

1. In a device of the class described, a horizontal base member, a horizontal support mounted on said base member for rotation about a vertical axis, a standard carried by and projecting upwardly from said support, a slide member supported by said standard adjacent the upper end thereof for horizontal movement, a horizontal shaft projecting from said slide member, a pneumatic tire casing supporting means rotatable about said shaft, a post secured to said base member in spaced and parallel relation to said standard, an arm having one end thereof pivotally supported by said post, said arm in operative position projecting from the post in a direction toward said horizontal shaft, a relatively long curved tire tread cutting blade projecting laterally from the other end of said arm and being disposed to penetrate the tread of a tire casing mounted on said supporting means upon rotation of said support about its vertical axis, and means supported by said standard for imparting horizontal movement to said slide member with a corresponding movement of said supporting means toward and away from said blade.

2. The structure according to claim 1, wherein said arm is swingable about its pivotal connection with said post to an inoperative position, and a pair of guide members supported by said post and projecting from said pivotal connection toward said horizontal shaft and between which a portion of said arm is disposed when in its operative position for bracing same.

3. The structure according to claim 1, wherein said other end of said arm is provided with a head having a groove therein disposed transversely of the arm, the butt end of said blade having an elongated slot, and adjustment screws extending through said slot and engaged in threaded openings in the head at the base of said groove.

4. The structure according to claim 1, wherein said blade tapers from its butt end to a point at its free end and has a longitudinal arc roughly conforming to and parallel with the arc described by said supporting means upon rotation of said support about said vertical axis.

PAUL E. HAWKINSON.

References Cited in the file of this patent

UNITED STATES PATENTS

| Number | Name | Date |
|---|---|---|
| 262,896 | Hoff | Aug. 15, 1882 |
| 1,256,751 | Wenzel | Feb. 19, 1918 |
| 1,424,012 | Grove | July 25, 1922 |
| 1,956,331 | Mullin | Apr. 24, 1934 |
| 2,009,524 | Schmidt | July 30, 1934 |
| 2,029,511 | Steiner | Feb. 4, 1936 |
| 2,229,713 | Wilke | Jan. 28, 1941 |
| 2,294,047 | Pollock | Aug. 25, 1942 |
| 2,392,667 | Hawkinson | Jan. 8, 1946 |
| 2,562,818 | Polk | July 31, 1951 |

FOREIGN PATENTS

| Number | Country | Date |
|---|---|---|
| 702,435 | Germany | Feb. 7, 1941 |